Patented Aug. 5, 1947

2,425,173

UNITED STATES PATENT OFFICE 2,425,173

BETA-NORBORNYL ESTERS

Herman A. Bruson, Philadelphia, Pa., assignor to The Resinous Products & Chemical Company, Philadelphia, Pa., a corporation of Delaware No Drawing. Application June 22, 1944, Serial No. 541,647

7 Claims. (Cl. 260—487)

This invention relates to esters of $\beta$-norborneol and a method for their preparation.

$\beta$-Norborneol was described by Kompa and Beckmann (Liebig's Annalen der Chemie, 512, 172 (1934)) who obtained it from $\beta$-norbornyl-amine by diazotization and hydrolysis. They also prepared an acetate and an acid phthalate of $\beta$-norborneol by direct esterification of the alcohol.

An object of this invention is to provide an inexpensive method by which esters of this heretofore rare alcohol may be obtained from readily available hydrocarbons.

Another object is to provide $\beta$-norbornyl esters of halogenated fatty acids as new compositions of matter possessing valuable properties as intermediates for insecticidal compounds.

According to this invention, $\beta$-bornyl esters are obtained by reacting upon bicyclo-(2,2,1)-5-heptene, the addition product of cyclopentadiene and ethylene (Joshel and Butz, J. Amer. Chem. Soc. 63, 3351 (1941)), with an organic carboxylic acid in the presence of an acidic condensing agent as catalyst.

Typical acidic condensing agents which serve as catalysts for the reaction are sulfuric acid, organic sulfonic acids, for example benzene sulfonic acid, acid sulfuric acid esters, such as butyl acid sulfate, and strongly acidic halides, such as stannic chloride, ferric chloride, titanium tetrachloride, anhydrous aluminum chloride, antimonic chloride and the like. Of particular value as catalysts are the halides of boron such as boron trichloride or boron trifluoride. The latter is advantageously employed in the form of a coordination complex with oxygenated compounds such as ethers, esters, ketones, carboxylic acids or water as exemplified by boron trifluoride-diethyl ether $BF_3.O(C_2H_5)_2$, boron trifluoride dibutyl ether $BF_3.O(C_4H_9)_2$, boron trifluoride-acetic acid $BF_3.2CH_3COOH$, dihydroxy fluoboric acid, fluoboric acid, and the like.

The quantity of active catalyst employed may be varied over a wide range. Good results have been obtained with as little as two per cent of catalyst, based on the weight of the cyclopentadiene-ethylene adduct, up to and exceeding a molar equivalent of catalyst per mol of adduct used.

The preferred temperature range is from about 50° C. to about 100° C. Inert solvents such as dioxane, ethylene dichloride or dibutyl ether may be used, if desired, to facilitate the stirring of the reaction medium particularly when solid carboxylic acids are used.

In practicing this invention, it has been found that a wide variety of organic carboxylic acids containing one or more carboxyl groups may be employed. These may be aliphatic, arylaliphatic, cycloaliphatic, hydroaromatic, or heterocyclic and may be saturated or unsaturated in character. It has also been established that the organic non-carboxyl portion of the reacting carboxylic acid compound may contain a wide variety of groups or substituents, for example chloro, bromo, fluoro, iodo, cyano, thiocyano, nitro, keto or acyl, mercapto, ether, acyloxy, alkoxy, aryloxy, carbalkoxy, hydroxy or other relatively inert radicals.

It should be noted at this point that, in the case of carboxylic acids having free hydroxyl or mercapto groups, excess cyclopentadiene-ethylene adduct is necessary since etherification of the free hydroxyl or mercapto group occurs in addition to esterification of the free carboxyl group.

Typical useful organic carboxylic acids for the purpose of this invention are the following:

Formic, acetic, propionic, butyric, isobutyric, valeric, capric, 2-ethyl butyric, 2-ethyl hexoic, lauric, palmitic, stearic, oleic, linoleic, linolenic, ricinoleic, elaeostearic, licanic, abietic, glycolic, lactic, $\alpha$-hydroxy-isobutyric, chloroacetic, dichloroacetic, trichloroacetic, $\beta$-chloropropionic, $\beta$-bromopropionic, $\alpha$-chloroisobutyric, thioglycolic, acrylic, crotonic, $\alpha$-methyl acrylic, ethoxyacetic, phenoxyacetic, benzoic, naphthenic, and furoic acids. Among the polycarboxylic acids, oxalic, succinic, maleic, phthalic, adipic, azelaic, and sebacic are the most useful.

It is rather remarkable that the esters formed are exclusively those of $\beta$-norborneol which alcohol can be obtained directly therefrom by saponification. No traces of the stereoisomeric $\alpha$-norbornyl esters are formed.

The following examples illustrate this invention.

Example 1

A mixture of 12.2 g. of benzoic acid, 0.5 g. of 40% sulfuric acid, and 9.4 g. of cyclopentadiene-ethylene adduct, bicyclo-(2,2,1)-5-heptene was stirred at 95° C. for seven and one-half hours. The dark oil obtained was cooled, then washed with water, with dilute soda solution, and finally again with water. The washed, dried oil was distilled in vacuo to yield 15 g. of pure $\beta$-norbornyl benzoate as a colorless oil boiling at 131°–133° C./2 mm.

Example 2

A mixture of 53 g. of formic acid (87%), 3 g. of 40% sulfuric acid, and 19 g. of cyclopentadiene-ethylene adduct, stirred at 95° C. for three hours and worked up as in Example 1, yielded 19 g. of $\beta$-norbornyl formate as a colorless oil boiling at 80°–81° C./25 mm.

Example 3

A mixture of 109 g. of $\beta$-chloropropionic acid, 94 g. of cyclopentadiene-ethylene adduct and 3 g. of 40% sulfuric acid, stirred at 96° C. for four hours, yielded 161 g. of β-norbornyl-chloropropionate as a colorless oil boiling at 90°–93° C./0.5–1 mm.

Example 4

A mixture of 95 g. of chloroacetic acid, 3 g. of 40% sulfuric acid, and 94 g. of cyclopentadiene-ethylene adduct yielded 128 g. of β-norbornyl chloroacetate as a colorless oil boiling at 83°–85° C. at 0.5 mm.

Example 5

A mixture of 16. g. of lactic acid (85%), 3 g. of 40% sulfuric acid, and 28.2 g. of cyclopentadiene-ethylene adduct was stirred eight hours at 93° C. The product was worked up as in Example 1 to yield two main fractions as follows:

(I)   17 g. B. P. 90°–148° C./2 mm.
(II)   9 g. B. P. 148°–158° C./2 mm.

Fraction I, upon redistillation, yielded 10 g. of β-norbornyl lactate as a colorless oil boiling at 88°–91° C./1.5–2 mm.

Fraction II, upon redistillation, yielded 6 g. of the β-norbornyl ether of β-norbornyl lactate as a colorless oil boiling at 150°–154° C./1.5 mm.

Example 6

A mixture of 150 g. of glacial acetic acid, 2 g. of 95% sulfuric acid, and 55 g. of cyclopentadiene-ethylene adduct, stirred for four hours at 60°–65° C. and worked up as in Example 1, yielded 77 g. of β-norbornyl acetate as a colorless oil boiling at 85°–96° C./29 mm.

Example 7

A mixture of 15.2 g. of glycol acid, 2 g. of boron trifluoride-dibutyl ether complex, $BF_3 \cdot O(C_4H_9)_2$, and 37.6 g. of cyclopentadiene-ethylene adduct was stirred at 98° C. for eight hours and worked up as in Example 1. The product, boiling at 158°–172° C./1.5 mm., was a colorless oil having the formula

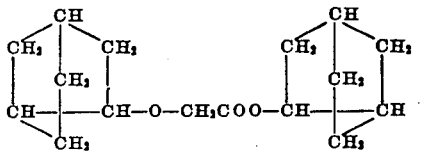

Many of the new esters which may be prepared by the process herein described are useful as softeners and plasticizers for resinous compositions. Esters of long-chained dibasic acids are also useful as components of lubricating compositions and hydraulic fluids.

I claim:

1. A method for preparing esters of β-norborneol which comprises reacting an organic carboxylic acid with the cyclopentadiene-ethylene adduct (bicyclo-(2,2,1)-5-heptene) in the presence of an acidic condensing agent.

2. A method for preparing esters of β-norborneol which comprises reacting an organic carboxylic acid with the cyclopentadiene-ethylene adduct (bicyclo-(2,2,1)-5-heptene) in the presence of sulfuric acid.

3. A method for preparing esters of β-norborneol which comprises reacting an organic carboxylic acid with the cyclopentadiene-ethylene adduct (bicyclo-(2,2,1)-5-heptene) in the presence of a boron trifluoride catalyst.

4. A method for preparing esters of β-norborneol which comprises reacting a halogenated aliphatic carboxylic acid with the cyclopentadiene-ethylene adduct (bicyclo-(2,2,1)-5-heptene) in the presence of an acidic condensing agent.

5. A method for preparing esters of β-norborneol which comprises reacting a saturated aliphatic monocarboxylic acid of two to four carbon atoms having a chlorine group in the α-position with the cyclopentadiene-ethylene adduct (bicyclo-(2,2,1)-5-heptene) in the presence of an acidic condensing agent.

6. A method for preparing β-norbornyl chloroacetate which comprises reacting chloroacetic acid with the cyclopentadiene-ethylene adduct (bicyclo-(2,2,1)-5-heptene) in the presence of an acidic condensing agent.

7. A method for preparing β-norbornyl chloropropionate which comprises reacting β-chloropropionic acid with the cyclopentadiene-ethylene adduct (bicyclo-(2,2,1)-5-heptene) in the presence of an acidic condensing agent.

HERMAN A. BRUSON.

REFERENCES CITED

The following references are of record in the file of this patent:

UNITED STATES PATENTS

| Number | Name | Date |
| --- | --- | --- |
| 1,838,465 | Stephan et al. | Dec. 29, 1931 |
| 1,420,399 | Andreau | June 20, 1922 |
| 2,272,400 | Borglin | Feb. 10, 1942 |

OTHER REFERENCES

Joshel et al., "Jour. Am. Chem. Soc., vol. 63 (1941), pages 3344–3347.

Kompa et al., Annalen der Chemie, vol. 512 (1934), page 172.

Tsuji, Chem. Abstracts, vol. 29 (1935), page 4828.